March 17, 1959
J. H. BOOTH
2,878,047
PLASTIC LINED BALL JOINT ASSEMBLY
Filed May 31, 1955
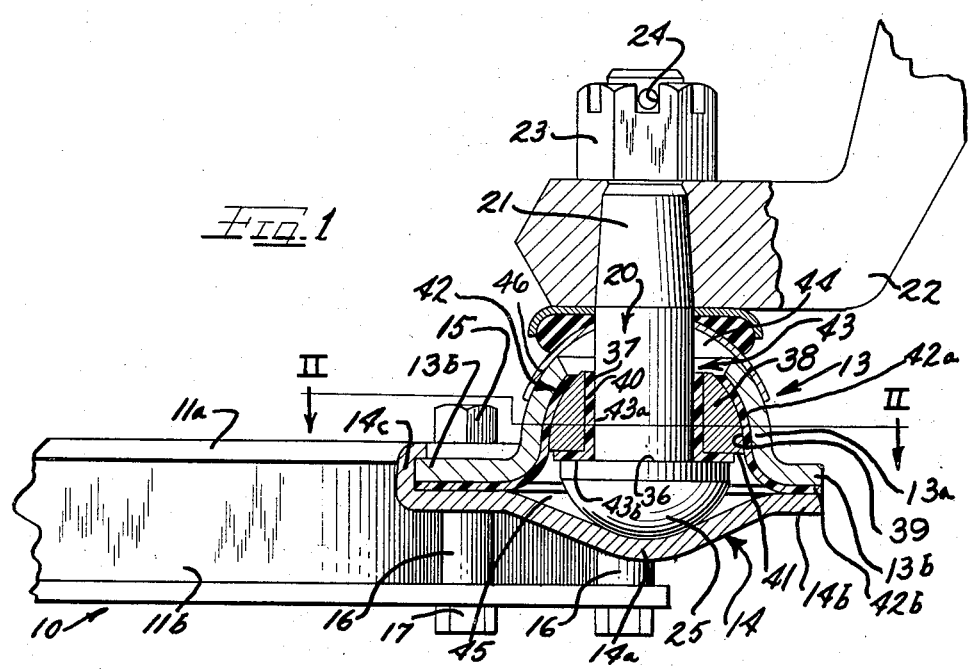
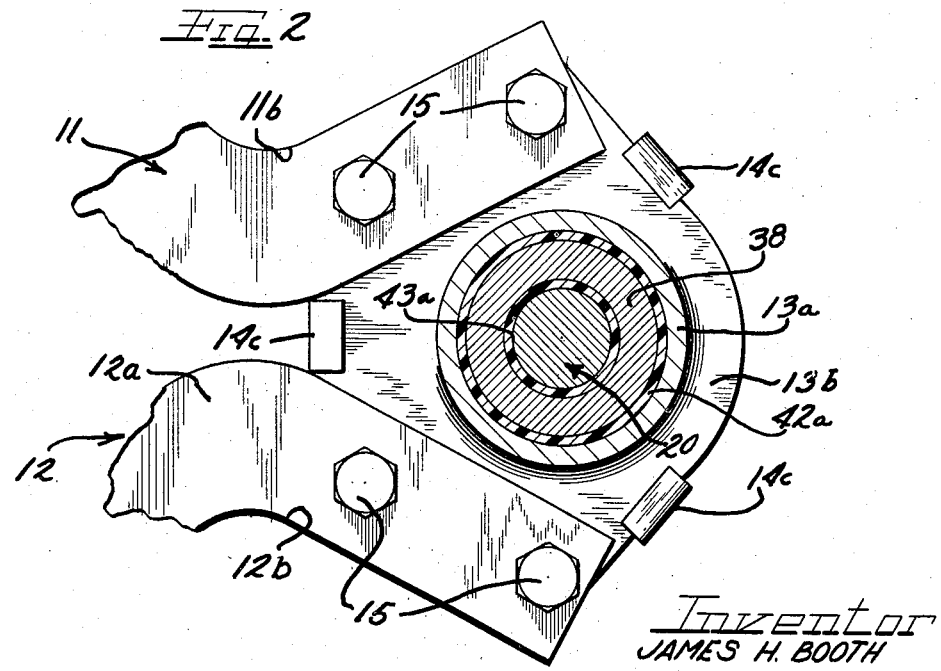
Inventor
JAMES H. BOOTH

United States Patent Office 2,878,047
Patented Mar. 17, 1959

2,878,047

PLASTIC LINED BALL JOINT ASSEMBLY

James H. Booth, Detroit, Mich., assignor to Thompson Products Inc., Cleveland, Ohio, a corporation of Ohio Application May 31, 1955, Serial No. 511,961

2 Claims. (Cl. 287—90)

The present invention relates to ball joints and is concerned, more particularly, with the provision of a substantially improved greased-for-life ball joint structure capable of supporting substantial loads without deterioration.

For many years, ball joints have been utilized in automotive vehicles for such parts as tie rod ends, drag link connections and similar parts carrying nominal loads. In recent years ball joints have successfully been utilized in supporting the front wheel spindles relative to the vehicle frame and in such use have been forced to carry the load of the vehicle. In this latter type of ball joint a heavy duty construction has been required and in the structures that have proven successful in this heavy duty job, the component parts have been hardened and ball bearings utilized to reduce friction and prolong the useful life of the parts. Needless to say, such heavy duty ball joints have been relatively expensive and have required constant vigil and lubrication in order to prevent premature wear and malfunctioning.

In accordance with the teachings of the present invention, a heavy duty ball joint capable of carrying large suspended loads, such as those applied to an automotive front wheel suspension ball joint, is provided. At the same time, however, continual lubrication is rendered unnecessary since the joint is sealed against dirt and is constructed to operate satisfactorily without grease after its initial break-in period. Further, hardened parts are maintained at an absolute minimum and ball bearings have been completely eliminated without at the same time seriously reducing the freedom of turning movements of the joint.

These improved functions, which provide a substantially less expensive joint entirely suitable for any automotive heavy duty applications, have been achieved in the present instance through the use of a novel plastic liner construction in combination and cooperation with steel bearing parts. Thus, a thin molded liner of a self-lubricating plastic is positioned in snug, non-rotational, contact with the segmental spherical housing of a ball joint and is maintained in such position by grasping the outer peripheral edge of the liner between adjacent clamp housing parts. A hardened bearing ring having a machined-segmental-spherical surface on its outer surface is positioned in bearing contact with the inside surface of the liner and this bearing ring in turn carries a second plastic liner positioned in a cylindrical bore therein. This second cylindrical liner carries in turn a steel ball stud in such a manner as to prevent extrusion of the plastic from between the stud and the bearing ring under load. As a result of this construction, the rotational movements of the stud ordinarily occur between the stud and the bearing ring while tilting movements of the stud are permitted by movement of the bearing ring, relative to the outer housing. Both of these motions are made possible, under loads, and without continual greasing, through the use of the plastic liners as above described and as will hereinafter be more fully set forth.

It is, therefore, an object of the present invention to provide a novel and substantially improved load carrying ball joint.

Another object of the present invention is to provide a greased-for-life ball joint having very satisfactory bearing characteristics under load with a minimum of machined bearing surfaces.

Still a further object of the present invention is to provide a novel, plastic lined ball joint.

Another object of the present invention is to provide a satisfactory load carrying ball joint providing both rotational and tilting movement between joined members and wherein such movement is in all cases accomplished through a bearing contact between metal and a self-lubricating plastic.

Yet another object of the present invention is to provide a plastic lined ball joint wherein the plastic liners are positively prevented from undesired cold flow under load conditions.

A feature of the invention resides in the use of a thin plastic liner material between pairs of metallic bearing surfaces.

Another feature of the invention resides in the provision of a ball joint utilizing a plastic liner wherein the plastic liner serves simultaneously as a bearing surface and as a dirt sealing gasket.

Another feature of the invention lies in the suspension of a hardened steel bearing part between a pair of self-lubricating plastic bearing liners supported by respective load carrying members.

Still other and further objects and features of the present invention will at once become apparent to those skilled in the art from a consideration of the attached drawings wherein a preferred embodiment of the present invention is shown by way of illustration only and wherein:

Figure 1 is a side elevational view of a ball joint constructed in accordance with the principles of the present invention, taken in partial cross-section; and Figure 2 is a plan view, in partial cross-section, taken along the line II—II of Figure 1.

As shown on the drawings:

In the figures, the joint of the present invention is illustrated in association with now well known vehicle front wheel suspension parts. While it will, of course, be apparent that the joint is applicable to numerous types of suspension members, for purposes of illustration it is shown with a suspension of the stamped metal type generally illustrated in my previous application Serial No. 442,981, filed July 13, 1954, now Patent No. 2,797,930. This system includes a lower control arm 10 comprising a pair of stamped arms 11 and 12 having horizontal ball joint supporting flanges 11a and 12a respectively, and vertical rigidifying walls 11b and 12b respectively.

As shown, the ball joint itself forms a part of the lower control arm by bridging the arms 11 and 12. Thus, the ball joint housing comprises an upper stamped metal portion generally indicated at 13 and having a segmental spherical portion 13a and a surrounding flange 13b. The lower housing portion generally indicated at 14 is likewise constructed of stamped metal and is provided with a ball stud receiving socket portion 14a and a surrounding flange 14b having a plurality of integral retaining fingers 14c crimped over the flange 13b to provide a complete, assembled, housing. The flanges 13b and 14b are rigidly secured to the control arms 11 and 12 by means of bolts 15 passing through the flanges 11a, 12a, the ball joint housing, spacers 16 and the lower horizontal wall of the stamped control arms 11 and 12 against which the spacers 16 are maintained by nuts 17. In practice, the housing portions 13 and 14 are constructed of heavy gauge sheet steel of sufficient strength to not only support the internal parts of the ball joint but also to provide substantial rigidity to the end of the control arm 10. It has been found that the manufacture of the upper housing portion 13 of approximately 4 gauge steel and the lower housing portion 14 of a slightly lighter weight material provides an entirely satisfactory structure for these purposes.

The internal parts of the ball joint comprise a stud 20 having a conventionally tapered surface 21 for wedging engagement with the wheel spindle support bridge 22. The stud 20 is secured to the bridge, or steering knuckle 22 by conventional fasteners such as the castellated nut 23 and cotter key 24.

The stud 20 is provided with an enlarged segmental spherical head portion 25 having a flat bearing surface 36. The central portion of the stud 20 is machined to provide a cylindrical bearing surface 37 adjacent the flat surface 36. A hardened annular bearing ring 38 having an outer segmental spherical surface 39, an inner cylindrical bore 40 and a lower flat bearing surface 41 is positioned between the segmental spherical housing portion 13a and the stud 20. Contact between the metal parts 13a, 38 and 20 is, however, prevented in accordance with the present invention by means of a pair of thin plastic liners. The liners are premolded into the generally annular shapes shown in Figure 1 and comprise an outer liner 42 and an inner liner 43. Both of the liners are relatively thin, approximately 1/32 inch and are inserted for their bearing and sound deadening characteristics rather than for physical support functions. Preferably, the liners are constructed of self-lubricating plastics of the waxy type such as, for example, the high molecular weight polyamides, polyethylene and so forth. It has been found that these substances may be initially greased to provide for wearing in of the bearing surfaces but need no additional grease for the life of the bearings.

The outer liner 42 is preferably premolded to provide a segmental spherical portion 42a and an outer peripheral flange portion 42b. The portion 42a rests in bearing contact between the annular hardened bearing ring 38 and the segmental spherical portion 13a of the housing 13. Since plastics of the type above described may be termed semi-resilient, or capable of slight amounts of cold flow, the internal surface of the housing portion 13a need not be machined after stamping. When assembled, the bearing liner 42 will deform locally on its outer surface to assume the exact configuration of the housing portion 13a without affecting the internal bearing surface in contact with the hardened ring 38. The very slight irregularities in the internal surface of the housing portion 13a actually provide a beneficial service in interlocking with the surface of the liner to prevent any tendency of the liner to rotate or otherwise shift its position relative to the housing. The outer peripheral edge 42b of the liner 42 is tightly clamped between the flanges 13b and 14b. This clamping prevents the material of the liner from cold flowing out of its proper position between the parts 13a and 38 and simultaneously provides a completely tight sealing gasket between the flanges 13b and 14b. It has been found that the moderate deformability of the plastic material permits an absolutely tight gasket seal without the necessity of machining either of the flanges 13b or 14b. This is extremely important since it is not contemplated that the ball joint of the present invention be lubricated subsequent to its initial lubrication and accordingly the ingress of dirt or other foreign matter into the bearing must be absolutely prevented in order to retain the bearing's efficiency. The use of the peripheral extension of the bearing liner 42 has satisfactorily accomplished this function in an unusually inexpensive and effective manner.

The inner plastic liner 43 has a tubular cylindrical portion 43a in bearing contact with the cylindrical surface 37 of the stud 20 and an annular flanged portion 43b in bearing contact between the flat surface 36 of the stud 20 and the annular bearing ring 38. Preferably, this liner is likewise premolded into the shape shown. In order to provide the utmost in bearing efficiency it is desirable that the surfaces 36 and 37 be machined to provide for a smooth bearing surface between the liner 43 and the stud 20. However, in view of the hardened and accurately machined surfaces 40 and 41 of the hardened bearing ring 38, and the smooth bearing condition which exists between the bearing ring and the inner liner 43, it is not absolutely necessary to machine the surfaces 36 and 37 in order to provide bearing action. However, by machining the surfaces 36 and 37 a fully floating bearing arrangement is provided which reduces frictional losses to a minimum. Accordingly, it is desirable to finish machine surfaces 36 and 37. In view of the angled shape of the liner 43 it is substantially impossible for the liner to cold flow out from between the stud 20 and the bearing ring 38 in either the radial or axial directions. Accordingly, it has been found that the cold flow taking place in the liner 43 is as negligible as that occurring in connection with the liner 42, the latter of which has the advantage of being peripherally secured in a positive manner.

In operation, the parts are assembled as shown in Figures 1 and 2. During this assembly grease is packed in the housing, filling the void portions 44 and 45. The seal formed by the liner 42 between the flanges 13b and 14b, and the upper seal generally indicated at 46 prevent this grease from leaving the assembly but do not apply any appreciable pressure to the grease itself. Since the joint is constructed to operate without grease after the initial breaking-in period, no external grease fittings whatever are provided.

Since the joint illustrated is a load carrying joint and the stud 20 is in tension against the upper housing portion 13a, no springs have been illustrated for maintaining the parts in their proper bearing relationship. However, it will be understood that in some uses a spring may be desirable between the wall stud head 25 and the portion 14a of the housing for urging the stud and the annular ring 38 into the proper bearing relationship with the internal segmental spherical surface 13a.

It has been found that the joint above described in which thin premolded liners of self-lubricating plastic are utilized provides an extremely satisfactory heavy duty load carrying joint. Due to the restraints placed upon the thin liners by clamping, or by their angular configuration as in the case of the inner liner 43, cold flow has been reduced to a minimum and is sufficiently controlled to prevent failure of the joint from this cause. Flow is also minimized by the fact that the bearing loads are placed on a very thin material thereby minimizing flow of the plastic liner internally, between its bearing wall surfaces, a condition which sometimes exists, tending to internally rupture the material in excessive flow conditions occurring in some bushing installations in which thick bushings have been utilized.

It will thus be understood that I have provided a novel and extremely efficient load carrying ball joint which not only provides efficient, greased-for-life bearing surfaces with an absolute minimum of expensive machining operations but also provides an inherently quiet, noise dampened joint admirably suited for automotive vehicle suspension systems. It will, of course, be understood that the joint may be utilized in other uses, however, and that variations and modifications may be made to the structure without departing from the novel concepts of the present invention. It is, therefore, my intention that the scope of the present invention be limited solely by that of the hereinafter appended claims.

I claim as my invention:

1. A sound deadening, self-lubricating ball joint comprising a housing having a first segmental spherical cup member with a central aperture therein and an outwardly extending peripheral flange, a second bottom member having an outwardly extending peripheral flange fixedly secured to the first cup member thereby to form a ball socket, a stud in said socket and projecting through said aperture, said stud having a cylindrical portion secured to an enlarged head portion within said socket, an annular bearing ring surrounding said cylindrical portion and having an external segmental spherical surface complementing the said segmental spherical socket, a thin self-lubricating plastic liner positioned between said ring and said first member and fully supported by said first member and means securing said liner between said flanges by a radially outwardly projecting thin peripheral edge thereof to seal said socket at the joint between said members and retain said liner in proper bearing relation between said ring and said first cupped member.

2. A sound deadening, self-lubricating ball joint comprising a housing having a first segmental spherical cup member with a central aperture therein and an outwardly extending peripheral flange, a second bottom member having an outwardly extending peripheral flange fixedly secured to the first cup member thereby to form a ball socket, a stud in said socket and projecting through said aperture, said stud having an external segmental spherical surface associated therewith and complementing the said segmental spherical cup member, and a thin self-lubricating plastic liner positioned between said last named surface and said cup member and fully supported by said cup member and having a radially outwardly extending thin peripheral edge clamped between said flanges to provide a sealing gasket between said members and to retain said liner in permanent position between said external segmental spherical surface and said cup member.

References Cited in the file of this patent
UNITED STATES PATENTS

| | | |
|---|---|---|
| 1,051,025 | Spicer | Jan. 21, 1913 |
| 1,817,528 | Skillman | Aug. 4, 1931 |
| 2,328,330 | Eddington | Aug. 31, 1943 |
| 2,398,848 | Newey | Apr. 23, 1946 |
| 2,461,626 | Booth | Feb. 15, 1949 |
| 2,615,763 | Wolford | Oct. 28, 1952 |
| 2,644,199 | Miller | July 7, 1953 |
| 2,668,068 | Bredemeier | Feb. 2, 1954 |
| 2,686,070 | Booth | Aug. 10, 1954 |
| 2,726,105 | Koenig | Dec. 6, 1955 |